United States Patent [19]

Wiese

[11] 3,940,837

[45] Mar. 2, 1976

[54] HOT AIR FURNACE WITH IMPROVED HEAT EXCHANGER CONSTRUCTION

[75] Inventor: John M. Wiese, St. Louis, Mo.

[73] Assignee: The Singer Company, New York, N.Y.

[22] Filed: Aug. 9, 1974

[21] Appl. No.: 495,990

Related U.S. Application Data

[62] Division of Ser. No. 420,756, Dec. 30, 1973, Pat. No. 3,908,629.

[52] U.S. Cl. .............. 29/157.5; 29/512; 285/382.4; 285/222; 126/119
[51] Int. Cl.² .................... B23P 15/26; B21D 39/06
[58] Field of Search ................ 29/157.5, 157.4, 512; 285/382.4, 47, 222; 126/119

[56] References Cited
UNITED STATES PATENTS

| | | | |
|---|---|---|---|
| 822,475 | 6/1906 | Price | 285/382.4 |
| 1,250,881 | 12/1917 | Hodges | 29/157.5 |
| 1,291,578 | 1/1919 | McPhail | 285/222 |
| 1,583,758 | 5/1926 | White | 29/157.4 |
| 1,988,158 | 1/1935 | Brodell | 285/222 |
| 2,266,611 | 12/1941 | Martin et al. | 285/382.4 |
| 2,475,112 | 7/1949 | Stanitz | 29/512 |
| 3,131,468 | 5/1964 | Jordon et al. | 29/512 |
| 3,390,499 | 7/1968 | Jansson | 285/222 |
| 3,497,946 | 3/1970 | Tingley, Jr. | 29/512 |

FOREIGN PATENTS OR APPLICATIONS

| | | | |
|---|---|---|---|
| 1,066,112 | 4/1967 | United Kingdom | 29/509 |
| 48,133 | 1/1861 | France | 285/222 |
| 236,252 | 1/1910 | Germany | 285/222 |
| 571,296 | 4/1930 | Germany | 285/222 |

Primary Examiner—C. W. Lanham
Assistant Examiner—Dan C. Crane
Attorney, Agent, or Firm—M. J. Breen; C. A. Williams, Jr.; J. Halpern

[57] ABSTRACT

A hot air furnace which includes at least one heat exchange unit having at least one mounting flange section defining an opening therein and a plate member having an aperture therein corresponding to at least one of the openings in said heat exchange unit and in alignment therewith with sheet insulating material interposed between said plate member and heat exchange unit by virtue of the said flange being expanded into a plane parallel to that of said plate member to thereby secure the plate member and interposed insulating material in place on said heat exchange unit. A process for securing at least one plate member on at least one heat exchange unit of a hot air furnace including the steps of positioning sheet insulating material between the plate member and a mounting flange defined opening in the heat exchange unit, insertion of said flange through a corresponding opening in the plate member so as to form a sleeve of insulating material on the outer surface of the flange, and deforming the flange to urge same into a plane parallel with the plate member so as to secure said plate and insulating material in place on the heat exchange unit.

4 Claims, 6 Drawing Figures

HOT AIR FURNACE WITH IMPROVED HEAT EXCHANGER CONSTRUCTION

This is a division of U.S. application Ser. No. 420,756, filed Dec. 30, 1973, now U.S. Pat. No. 3,908,629.

BACKGROUND OF THE INVENTION

In the construction of gas-fired furnaces it is conventional to weld a pair of clam shells together to form a heat exchanger section and to incorporate at least one such section in the furnace. An opening is provided in the lower or pouch section of the heat exchange unit for insertion of a gas burner so that the section can be fired up to a predetermined capacity, frequently of the order of 25,000 B.T.U. per hour. An opening is also provided in the upper section of each heat exchange unit to permit collection and discharge of the flue gases produced by the gas burner. To the front of the heat exchanger there is generally secured a pouch plate over the pouch area and a front partition plate over the upper section of the heat exchanger. The combination of the pouch plate and front partition plate is then usually sealed to the sides of the furnace in order to isolate the air being heated by the heat exchanger sections in the rear of the furnace from the furnace controls located in the front. Once such gas-fired furnace is the "COMFORTMAKER" furnace manufactured by The Singer Company.

It has been customary in the art of gas-fired furnace manufacture to weld the pouch plate and front partition plate to the heat exchanger. This technique, however, is costly and the resultant structure is susceptible to cracking when subjected to expansion and contraction stresses which develop during the heat and off cycles of the furnace. One expedient resorted to in an attempt to overcome such disadvantages has been to provide mating flanges on the heat exchanger outlets and on the pouch and front partition plates. The mating flanges are then secured together by fastening means such as screws. However, assembly of the completed unit by this alternate technique is time-consuming and frequently results in distortion of the component parts. Also, component elements of the assembly tend to work loose when subjected to extend periods of expansion and contraction cycles.

SUMMARY OF THE INVENTION

In view of the foregoing it is one object of the invention to provide an improved process for securing the pouch plate and front partition plate to the heat exchangers of a gas-fired furnace.

Further objects and advantages of the invention will become readily apparent upon a reading of the following description of the invention.

BRIEF DESCRIPTION OF THE DRAWINGS

In order that the invention may be more fully understood it will now be described, by way of example, with reference to the accompanying drawings in which.

DETAILED DESCRIPTION OF THE INVENTION

Figure 1:
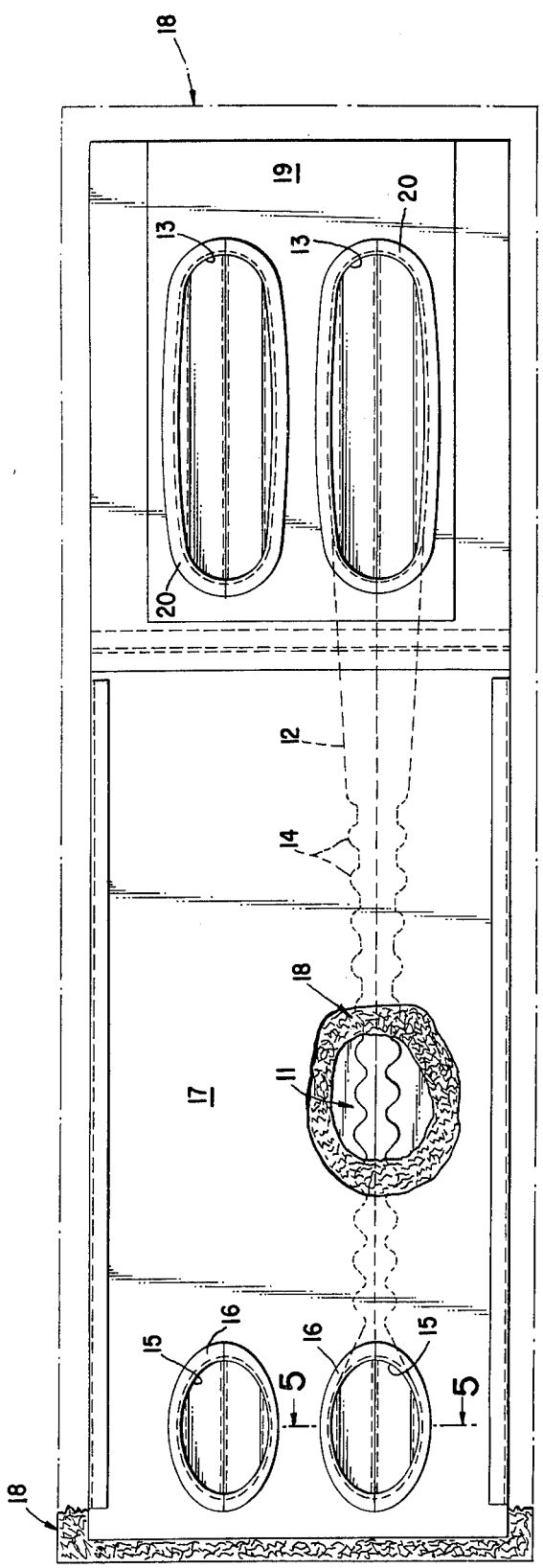
FIG. 1 is a front view, partially broken away, of a gas-fired furnace showing the pouch plate and front partition plate secured in place on the heat exchanger.

Referring to the drawings, particularly FIG. 1, there is shown a portion of a hot air furnace 10, preferably gas-fired, which includes at least one heat exchanger 11 formed by a pair of clam shells which have been welded together. The lower or pouch section 12 of the heat exchanger is provided with an opening 13 for reception of means such as a gas-burner (not shown) for firing of the unit. The upper section of the heat exchanger is generally corrugated as indicated by reference numeral 14 to increase the surface area and thus the heat transfer capacity of the unit. The upper section is also given a smoke opening 15 to permit the discharge of flue gases.

Figure 5:
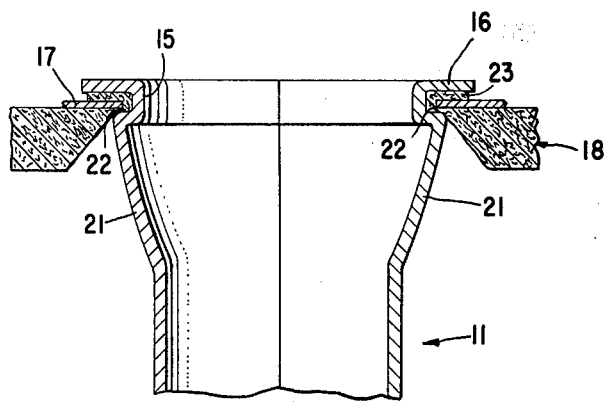
FIG. 5 is a cross-sectional view of the heat exchange unit depicted partially in phantom in FIG. 1 taken along line 5—5 of FIG. 1.

As shown in FIGS. 1 and 5, the opening in the upper section is defined by a forwardly extending mounting flange 16 which, as will be hereinafter described, is flared back or expanded such that the free end is caused to lie in a plane substantially perpendicular to the longitudinal axis of the flange. A sheet of material 17, such as sheet metal, commonly referred to as the vestibule panel or front partition plate, is secured in place to the front of the heat exchange unit. A sheet of insulating material 18, preferably ½ inch thick fiberglass, is interposed between the partition plate and the heat exchanger. Where desired the insulating material may be cemented to the back of the partition plate by means of any conventional adhesive. Also, the fiberglass employed may be provided with a foil material so that a portion of the heat generated by the heat exchanger will be reflected back thereby enabling the maintenance of a lower temperature on the partition plate.

The lower or pouch section 12 of the heat exchanger has secured in place thereover a pouch plate 19. The pouch section is provided with a mounting flange 20 which is forwardly extending prior to assembly of the pouch plate and which defines the pouch opening. Also, as with the front partition plate, it has been found advantageous to interpose a sheet of insulating material between the pouch plate and the pouch section of the heat exchanger.

Figure 2:
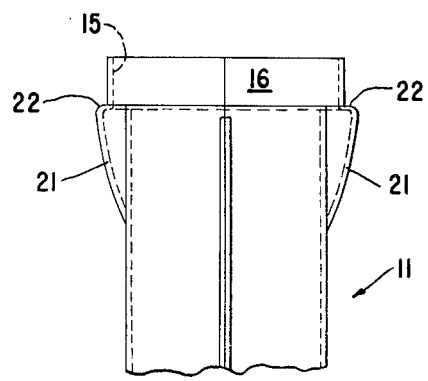
FIG. 2 is a top view of a clam shell heat exchange unit with the flange defining the smoke opening extended forwardly.

Referring to FIGS. 2 and 5 it will be seen that the heat exchanger is formed in the region of the smoke opening with a flared end portion 21 that is turned in to offer a shoulder 22 for a purpose to be hereinafter described. Mounting flange 16 then extends forwardly from the shoulder. The pouch section is similarly constructed with relation to the pouch opening.

Figure 3:
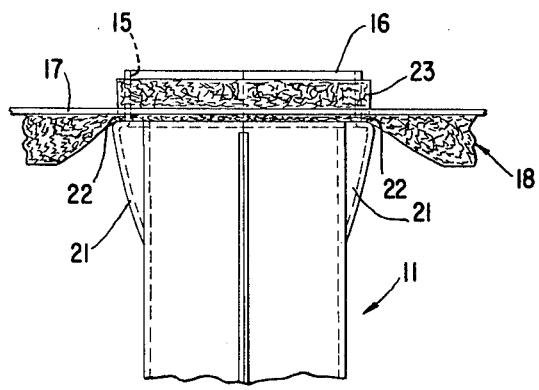
FIG. 3 is a view similar to FIG. 2 and illustrates the first step in the process of the invention.
Figure 4:
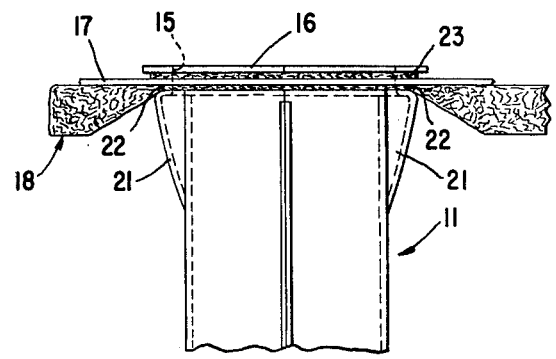
FIG. 4 is a view similar to FIG. 3 and illustrates the second step in the process of the invention.

As can best be seen by reference to FIGS. 3 and 4, the front partition plate and sheet insulating material are secured in place by a technique which is expeditious and avoids the need for a welding step or the use of any screws or other like fastening means. The partition plate 17, which is provided with an opening therein corresponding in dimension with that of the external diameter of flange 16, is assembled with a sheet of insulating material 18. The sheet of insulating material is given an opening somewhat less than the diameter of the smoke opening in the heat exchanger. The partition plate and insulating material are assembled such that their openings are in alignment and, with respect to the total dimensions of both components, such that the assembly may be secured in place on the heat exchanger with such openings in alignment with the smoke opening. The first step in the process comprises urging the assembly into place such that the flange 16 of the heat exchanger, whose inner diameter defines the smoke opening, projects through the opening in the partition plate and also through the opening in the sheet insulating material. As the flange emerges from the opening in the insulating material it causes a sleeve 23 of such material to form about its external surface as shown in FIG. 3. It will be observed that apart from the sleeve of insulating material thus formed on the flange the remainder of the insulating material is interposed between the partition plate and the heat exchanger in planar juxtaposition.

The next step in the process involves the expansion of the flange 16, such as by an expander device (not shown) so as to deform the outer portion thereof into a plane roughly parallel with that of the partition plate as may be seen from FIG. 4. In this step the flange, and the insulating material which previously formed sleeve 23, are urged against shoulder 22 to form a leakproof joint and at the same time secure the partition plate and sheet insulating material in place on the heat exchanger.

The foregoing description of the process for securing the partition plate and sheet insulating material to the heat exchanger need not be repeated in respect of application of the pouch plate and insulating material to the heat exchanger since the steps are identical. Further, it is within the contemplation of the invention to either apply the partition plate and insulating material to the smoke opening separately from application of the pouch plate and insulating material to the pouch opening or simultaneously therewith. For example, a single sheet of insulating material may be employed of sufficient size to cover the upper section of the heat exchanger as well as the pouch section. In such event, as will be readily appreciated, openings will be provided in the insulating material adapted for alignment with both the smoke and pouch openings. Further, the pouch plate and front partition plate may be applied as separate and distinct components, or a single plate member having two openings therein may serve as the cover plate for both upper section and the pouch section of the heat exchanger. For example, it has been found advantageous, in the utilization of the heat exchanger of this invention with roof top equipment, to employ separate pouch and smoke pipe plates to permit an opening in the center section for the passage of circulating air directly through the heat exchanger.

Figure 6:
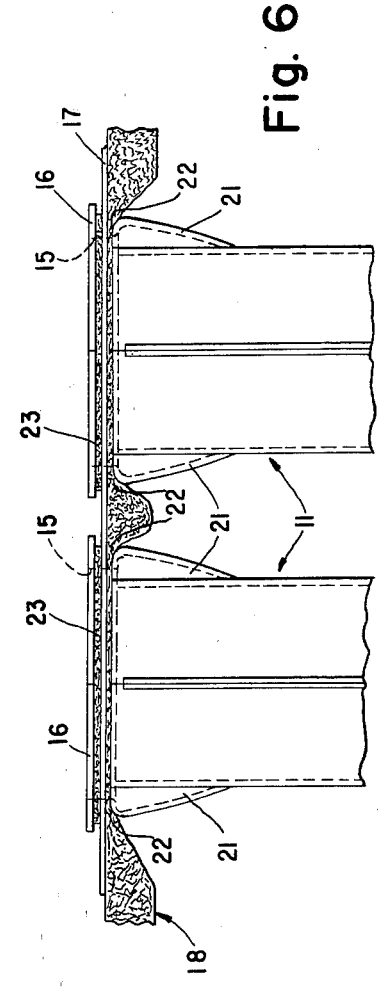
FIG. 6 is a view similar to FIG. 4 illustrating the insulation and front partition plate applied to a pair of heat exchange units.

As requires no elaboration, FIG. 6 illustrates the securing in place of the front partition plate and sheet insulating material across the front of a plurality of heat exchange units. It is within the ambit of the invention to practice the process in the construction of a furnace having as many as ten heat exchangers or conceivably an even greater number where this technique is considered appropriate.

The present specification has not described the use of any specific form of expander device for application in the step of expanding the flanges surrounding the smoke and pouch openings. Various such devices are well known, for example of the hydraulic type, and of single or multi-stroke capability. Selection of such a device is merely a matter of choice. Where necessary, of course, conventional expander devices may be modified to accommodate the dimensions and configuration of the smoke and pouch openings. Also, where required the heat exchanger unit may be constructed with one or more offset sections adapted to cooperate with the expander device during the step of expanding the flanges.

Numerous modifications of the process and structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

I claim:

1. A process of securing at least one plate member to at least one heat exchange unit of a hot air furnace, comprising providing at least one forwardly extending mounting flange on each of said heat exchange units defining an opening therein, forming openings in said at least one plate member congruent with said heat exchange unit openings, providing sheet insulating material substantially coextensive with said plate member, forming openings in said sheet insulating material substantially smaller than said heat exchange unit openings positioning sheet insulating material and said at least one plate member over said heat exchange unit with said insulating material interposed between said plate member and heat exchange unit, arranging said openings formed in said plate member in alignment with the openings defined by said mounting flanges on said heat exchange units arranging said insulating material openings covering a substantial portion of the openings defined by said mounting flanges on said heat exchange units but exposing a concentric portion of each said heat exchange unit opening, effecting relative movement between each said plate member and heat exchange unit so as to urge each of said mounting flanges through the corresponding apertures in said plate member to thus cause the portion of said insulating material overlying the flange defined openings to form a sleeve on the outer surface of said flange, thereafter expanding said flanges into a plate parallel with that of said plate member to thereby secure said plate member to said heat exchange unit with said insulating material therebetween and effect a leakproof joint between said plate member and heat exchange unit.

2. A process according to claim 1, wherein each said heat exchange unit is provided with a pouch opening and a smoke opening, affixing said insulating material to each said plate member and positioning the combined plate member and insulating material over each of said heat exchange units.

3. A process according to claim 2, wherein separate plate members are provided for positioning over the pouch and smoke openings of said heat exchange unit.

4. A process according to claim 2, wherein said insulating material and plate members are positioned over a plurality of said heat exchange units simultaneously.

* * * * *